United States Patent
Koster (12)

(10) Patent No.: US 6,356,756 B1
(45) Date of Patent: Mar. 12, 2002

(54) METHOD AND SYSTEM FOR ROUTING CALLS TO A WIRELESS TELECOMMUNICATIONS SERVICES PLATFORM

(75) Inventor: Karl H. Koster, Atlanta, GA (US)

(73) Assignee: BellSouth Corporation, Atlanta, GA (US)

( * ) Notice: Subject to any disclaimer, the term of this patent is extended or adjusted under 35 U.S.C. 154(b) by 0 days.

(21) Appl. No.: 09/140,302

(22) Filed: Aug. 26, 1998

(51) Int. Cl.⁷ .................................................. H04Q 7/20
(52) U.S. Cl. ...................... 455/445; 455/414; 455/417; 455/461; 379/211; 379/221.13; 379/221.02
(58) Field of Search ................................. 455/422, 406, 455/407, 413, 414, 415, 417, 445, 461; 379/207, 220, 114, 221.13, 221.02, 211

(56) References Cited

U.S. PATENT DOCUMENTS

| | | | | | |
|---|---|---|---|---|---|
| 5,216,703 | A | * | 6/1993 | Roy | 379/59 |
| 5,579,379 | A | | 11/1996 | D'Amico et al. | |
| 5,610,972 | A | * | 3/1997 | Emery et al. | 455/414 |
| 5,610,974 | A | | 3/1997 | Lantto | |
| 5,699,408 | A | | 12/1997 | Krolopp et al. | |
| 5,732,131 | A | | 3/1998 | Nimmagadda et al. | |
| 5,734,700 | A | | 3/1998 | Hauser et al. | |
| 5,748,717 | A | * | 5/1998 | Chan et al. | 379/120 |
| 5,758,281 | A | * | 5/1998 | Emery et al. | 455/428 |
| 5,805,997 | A | * | 9/1998 | Farris | 455/461 |
| 5,867,562 | A | * | 2/1999 | Scherer | 379/88.21 |
| 5,867,788 | A | | 2/1999 | Joensuu | |
| 5,915,220 | A | | 6/1999 | Chelliah | |
| 5,940,490 | A | * | 8/1999 | Foster et al. | 379/220 |
| 5,943,619 | A | | 8/1999 | Coyne et al. | |
| 5,978,678 | A | | 11/1999 | Houde | |
| 6,006,094 | A | | 12/1999 | Lee | |
| 6,011,975 | A | | 1/2000 | Emery et al. | |
| 6,026,298 | A | | 2/2000 | Lamb et al. | |
| 6,038,305 | A | * | 3/2000 | McAllister et al. | 379/207 |
| 6,039,624 | A | | 3/2000 | Holmes | |
| 6,240,293 | B1 | * | 5/2001 | Koster | 455/445 |

FOREIGN PATENT DOCUMENTS

WO    WO 98 14027    4/1998

* cited by examiner

Primary Examiner—Dwayne Bost
Assistant Examiner—Temica M. Davis
(74) Attorney, Agent, or Firm—James L. Ewing, IV, Esq.; Nora M. Tocups, Esq.; Kilpatrick Stockton LLP

(57) ABSTRACT

A method and system for routing calls to a wireless platform uses local number portability searches to achieve advanced intelligent network capabilities. The method and system of the present invention "ports" wireless subscriber numbers to a number for a platform providing a specific service. When a caller dials the subscriber's wireless number, a switch determines whether the number is portable. Since the number has been ported, the switch launches a query to a local number portability service control point to obtain additional routing instructions. The service control point accesses a local number portability database to determine the proper routing number. The new routing number allows calls to be routed to a service platform in the wireless network. The service control point transfers the routing number to the switch which then translates the routing number to a directory number for the platform. The call is then routed to the platform.

30 Claims, 3 Drawing Sheets

METHOD AND SYSTEM FOR ROUTING CALLS TO A WIRELESS TELECOMMUNICATIONS SERVICES PLATFORM

BACKGROUND OF THE INVENTION

1. Field of the Invention

The present invention is directed to wireless telecommunications and, more particularly, to a method and system for routing calls to a platform that performs wireless telecommunications services for wireless subscribers.

2. Background

Providing immediate access to home and work from remote locations, cellular, PCS, and wireless telephones have become increasingly popular. No longer prohibitively expensive, cell phones are used by a wide range of consumers. Presently, there are over 75 million cellular customers ("subscribers") worldwide. Predictions show that over 300 million customers will be using cellular systems by the year 2,000. Cell phones and systems that are being introduced to the market have advanced features, services, and cost advantages over the older cellular technologies.

Wireless service providers ("WSPs") offer their subscribers several options for improving their wireless telecommunications services. Certain services were created as added conveniences for the subscriber. Other services were created to reduce overall costs to the subscriber and/or the WSP. Three of the most popular services are the Follow Me service, the Pre-Paid Calling service, and the Calling Party Pays service.

The Follow Me service (a.k.a. "Single Number Service") allows a subscriber to be called at any time of the day using a single telephone number. The subscriber provides a schedule to the WSP, indicating the subscriber's usual whereabouts during the day. For instance, the subscriber may indicate that he is in his office during the morning hours, in his car during certain afternoon hours, and at home during the evening hours. In addition, the subscriber provides the directory numbers for each location. The WSP stores this information and the associated directory numbers for each location in a dedicated platform. The subscriber is then given a new Follow Me directory number that is associated with the platform providing the Follow Me services. When this number is called, the call is directed to the Follow Me platform which then locates the customer in real-time using the predefined schedule and telephone number (at his home, at his office, etc. . . . ).

Pre-Paid Calling allows a caller to purchase cellular service in discrete time increments. The subscriber purchases a certain number of minutes of cellular service from the WSP. The WSP provides a new directory number to the subscriber that is associated with a platform providing the Pre-Paid Calling services. Callers who dial this new are routed to the platform which stores information about the subscriber's account status. If the subscriber has time remaining in his account, the platform connects the call to the subscriber. If the subscriber has no time remaining in his account, the caller is informed of the subscriber's account status and the call is disconnected.

Calling Party Pays service allows a subscriber to request that callers pays for calls made to his wireless phone. The caller is provided a directory number for all Calling Party Pays calls. When callers dial the directory number, they are directed to a dedicated Calling Party Pays platform that asks the caller if she would like to pay for the call. If the caller responds in the affirmative, the call is connected to the caller. If the caller declines to pay, the call is disconnected.

While each of these services provide greater flexibility to the caller, they each have drawbacks as well. First, each service requires the provisioning of a new directory number that routes a caller to an adjunct platform. As the number of cellular subscribers increases and these services become more ubiquitous, the number of required directory numbers will increase as well.

The imposition of local number portability ("LNP") also poses problems for such services. LNP is designed to allow subscribers to switch (or "port") their directory numbers to another service providers within their area. Thus, service providers are required to provide an infrastructure for routing calls from their network to the network of the new service provider. With services that use adjunct platforms, the new number allocated for the platform must remain with the subscriber if the subscriber decides to change service providers. Currently, wireless providers do not have the sufficient mechanisms for routing ported calls to the adjunct platform.

One solution to this problem would be the implementation of wireless Advanced Intelligent Network ("AIN") capabilities (sometimes referred to as Wireline Intelligent Networks). Currently, wireline AIN allows calls to be quickly and efficiently routed to other locations within the network. AIN uses a group of switches, transfer points, and service control points ("SCPs") coupled to computer databases to make decisions regarding calls and route the calls to their proper destination. In addition, AIN uses a group of "triggers" that cause network components to behave differently and route calls differently than expected.

For instance, the terminating attempt ("TAT") trigger would be useful in routing wireless service calls to the proper platform. The TAT trigger causes a switch in the network to pause during call processing and obtain call routing instructions from an SCP. The SCP may access a database to determine the proper routing instructions. The SCP may then transmit a message back to the switch indicating the final destination of the call. Thus, in the wireless environment, the call could ultimately be routed to the proper platform despite local number portability requirements.

Unfortunately, AIN is very expensive to implement in a wireline network. A wireless version of AIN would likely be expensive to implement and would require a large financial undertaking by a wireless service provider.

SUMMARY OF THE INVENTION

The present invention provides a method and system for emulating certain AIN capabilities in a wireless environment without the need for wireless AIN elements. Specifically, the method and system of the present invention allows a wireless service provider to route calls to a service platform using local number portability elements and functionality. Thus, the service provider is not forced to provide additional directory numbers to subscribers. Since new numbers aren't provided, the problems associated with the porting of those numbers are also eliminated.

In a preferred embodiment of the present invention, wireless telecommunications services that use a platform having a unique NPA-NXXX may use local number portability capabilities in their own network as well as other network's to effect the routing required for the service. More particularly, the wireless service provider "ports" directory numbers of service subscribers to platforms within its own network. When a caller dials the subscriber, the local switch for the caller (whether wireline or wireless) suspends call processing to determine whether the number has been ported. First, the switch examines a table to determine the portability of the number. Since the number has been "ported" by the wireless service provider, the switch queries a local number portability service control point. The SCP accesses a database to determine the local routing number for the "new" number. The SCP then returns a local routing number corresponding to the platform for the service.

The platform may be coupled to an end office in the public switched telephone network (PSTN). Alternatively, the platform may be coupled to a mobile switch in the mobile network. In either event, the call is routed to the platform, which then performs the desired service. If the service is a Follow Me service, for example, the platform accesses records in a database and performs an algorithm to determine the most likely location of the subscriber. The platform then routes the call to the directory number of that location.

Since most wireline service providers are under an obligation to perform LNP functions for ported wireless numbers, this ensures that calls originating from other carriers will be directly routed to the adjunct platform without intelligent processing capabilities normally performed by the wireless service provider.

Accordingly, it is an object of the present invention to provide a method and system for routing calls to a wireless services platform that does not require the implementation of wireless AIN.

It is a further object of the present invention to provide a method and system for routing calls to a wireless services platform that emulates advanced intelligent network functionality.

It is an additional object of the present invention to provide a method and system for routing calls to a wireless services platform that uses the existing local number portability infrastructure.

It is yet another object of the present invention to provide a method and system for routing calls to a wireless services platform that does not require the provision of additional directory numbers.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1:
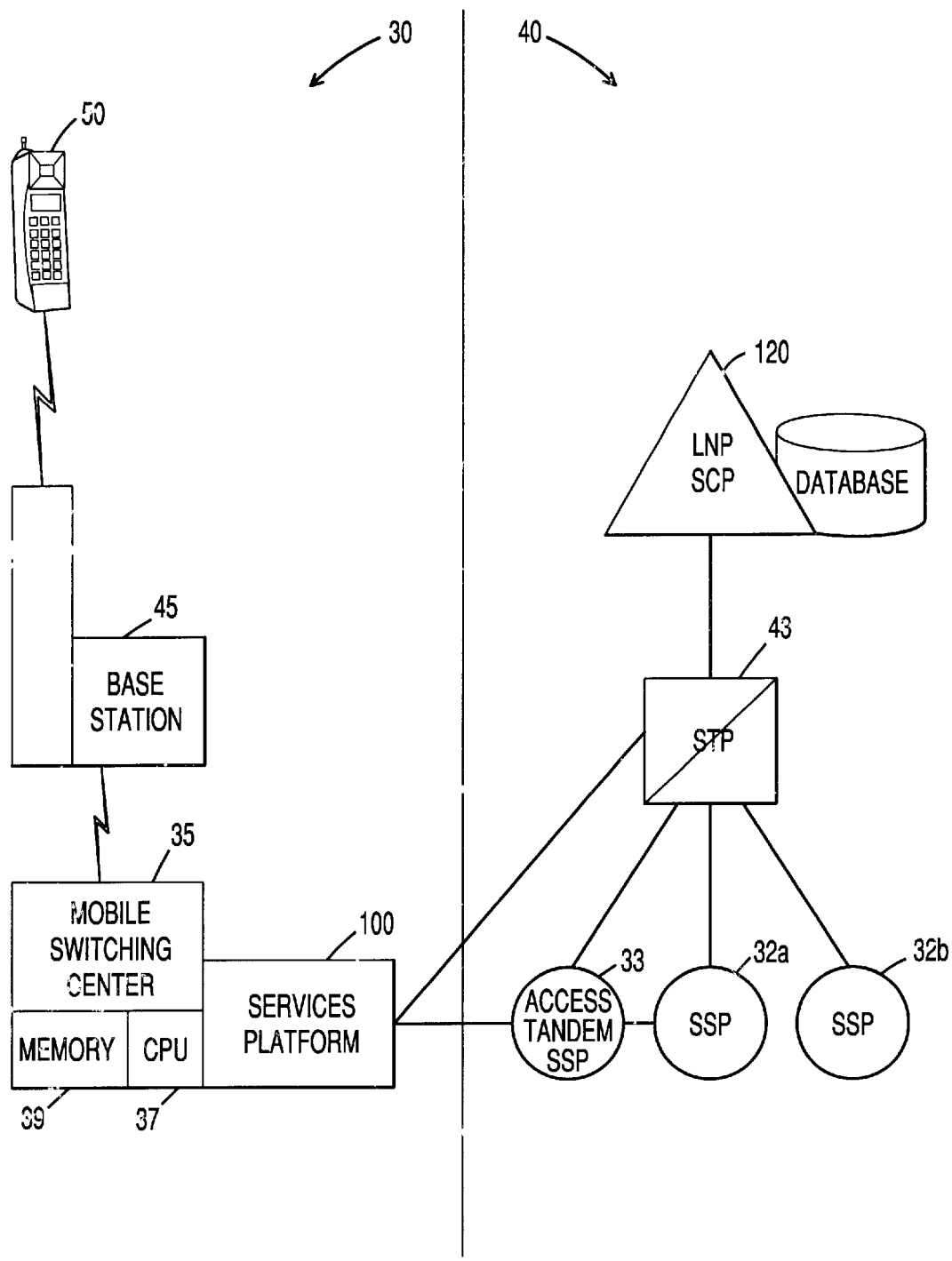
FIG. 1 is a block diagram of a wireless network coupled to a PSTN network, according to the present invention.

FIG. 1 is a block diagram of a wireless network 30 coupled to a PSTN network 40, according to the present invention. The mobile network includes at least one mobile switching center ("MSC") 35, one or more wireless base stations 45, and a cellular telephone unit 50 of a subscriber. The mobile switching center 35 monitors the location and call quality of mobile telephones and switches the mobile telephone call between cell sites and the public switched telephone network ("PSTN") 40. The MSC 35 receives the dialed digits, creates and interprets call processing tones, and routes the call paths. The MSC 35 includes controllers, switching assembly, communications links, operator terminal, and subscriber database information. The controllers guide the MSC 35 through the creation and interpretation of commands to and from the base stations 45. A switching assembly routes voice connections from the cell sites to each other or to the PSTN. An operator terminal allows operations, administration and maintenance of the system. The subscriber database contains customer-specified features and billing records. The MSC 35 may include additional components as well, including a processor 37 and a memory 39. The base station 45 is a controlling transmitting/receiving station that provides service to cellular telephone units within cell sites. Individual cellular telephone units 50 may utilize a single base station 45 to communicate with the MSC 35.

Figure 2:
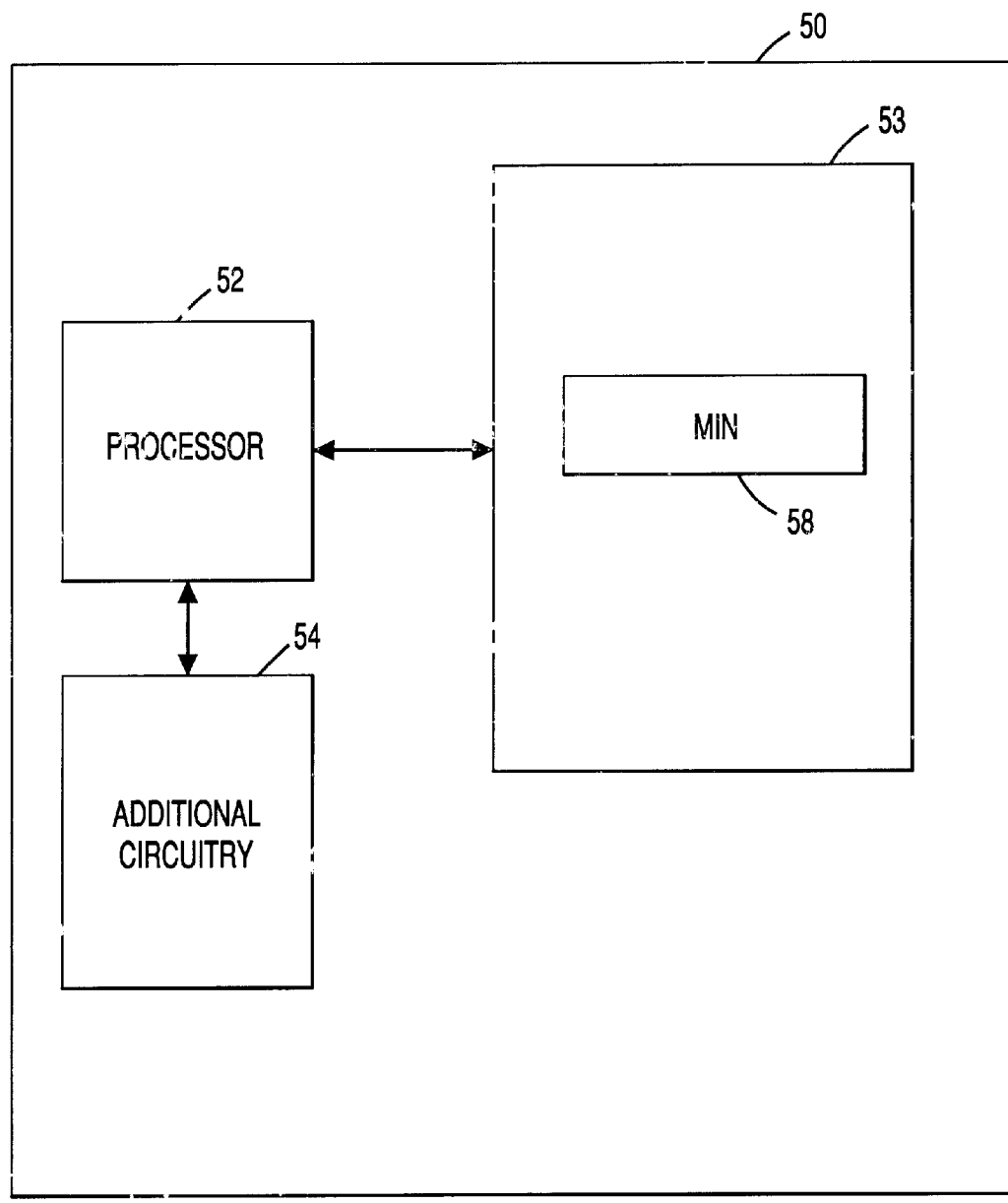
FIG. 2 is a block diagram of cellular telephone unit.

FIG. 2 is a block diagram of cellular telephone unit 50, in accordance with a preferred embodiment of the present invention. Cellular telephone 50 includes processor 52 capable of processing messages received by cellular telephone unit 50 using known hardware and according to known methods. To make each mobile telephone unique, several types of information is stored in its internal memory. This memory is called a Number Assignment Module 53. The NAM contains a Mobile Identification Number ("MIN") 58, which identifies the mobile cellular unit 50. The mobile cellular unit 50 further includes additional circuitry 54 for transmitting and receiving data.

As illustrated in FIG. 1, the PSTN 40 includes several Advanced Intelligent Network ("AIN") elements. For brevity, only a basic explanation of AIN is provided herein. Where the network 30 operates or is composed differently in an important aspect from that which would be understood by those skilled in the art, additional details are provided herein. For further information regarding AIN technology and aspects thereof, the interested reader is referred to U.S. Pat. No. 5,430,719, to Weisser, which is incorporated herein by reference.

The PSTN 40 includes a variety of interconnected network elements. A group of such network elements includes the plurality of end offices which are indicated as service switching points ("SSPs" or "switches") 32a, 32b in FIG. 1. An SSP typically includes switch functionality, but also includes other functionality so as to communicate with other AIN elements as those skilled in the art understand. Voice connections between the PSTN 40 and the mobile network 30 are made through an access tandem SSP 33. The tandem office 33 is used to connect and switch circuits between and among other end offices. Each SSP 32a, 32b serves a designated group of calling lines, and thus, the SSP that serves a particular calling line may be referred to as its serving switch. Data connections between the PSTN 40 and the mobile network 30 are made through a signaling transfer point 43. The STP 43 is a telephone network switching point that routes control messages to other switching points.

The PSTN further includes functionality for determining the portability of local directory numbers. Specifically, the PSTN 40 includes an LNP SCP database 120 coupled to one ore more SSPs through a signal transfer point 43. Local Number Portability ("LNP") allows a subscriber to change service providers and/or geographic location while retaining the same directory number. The subscriber retains this directory number despite a new recipient switch serving the subscriber's phone. When acting as originating switches, all SSPs in the network perform digit analysis on the dialed digits to determine whether the number has been ported. If the number has been ported, the SSP launches a query to the LNP SCP 120 based on the dialed digits. The LNP SCP 120 stores one or more LNP routing tables that indicate the routing number for the recipient switch. The LNP SCP 120 returns a response to the SSP indicating the routing number of the recipient switch. The originating switch analyzes the data, translates the data if necessary, and routes the call to the recipient switch. The recipient switch (SSP) then completes the call between end users.

Cellular subscribers in the mobile network may purchase various services from the cellular service provider. For example, subscribers may purchase Follow-Me services that allow a caller to be reached at any time during the day, based upon a predetermined schedule. To provide such services, the MSC 35 further includes a platform 100 for the service. The platform 100 is a computer and subscriber database containing each customer's MIN to uniquely identify each customer. The platform 100 uses certain criteria, such as the time of day and caller activation to redirect calls to a subscriber's home number, mobile number, or work number. The platform 100 performs an algorithm to determine the most likely location of the subscriber at any given time of day. Each subscriber is normally provided a separate directory number for the service. The directory number is the number that is called to reach the subscriber at different hours of the day. The directory number is a unique NPA-NXX for the platform 100. Although a Follow Me service is described, it should be apparent to one of ordinary skill in the arts that the principles described herein are equally applicable to other services that direct calls to a unique NPA-NXX for a specific platform.

In the present invention, the subscriber is not provided a new directory number. Instead, the wireless service provider ports the subscriber's cellular telephone number to the NPA-NXX for the service platform. Since this platform is owned by the wireless service provider, the service provider is essentially porting the number to itself. The wireless service provider notifies the PSTN service provider that the subscriber's directory number is portable. The PSTN service provider updates its network by creating an entry in all SSP tables to indicate the portability of the number. In addition, the PSTN service provider creates an entry in the LNP SCP routing tables. The entry includes the subscriber's wireless directory number and maps the wireless directory number to the NPA-NXX directory number for the platform 100.

Figure 3:
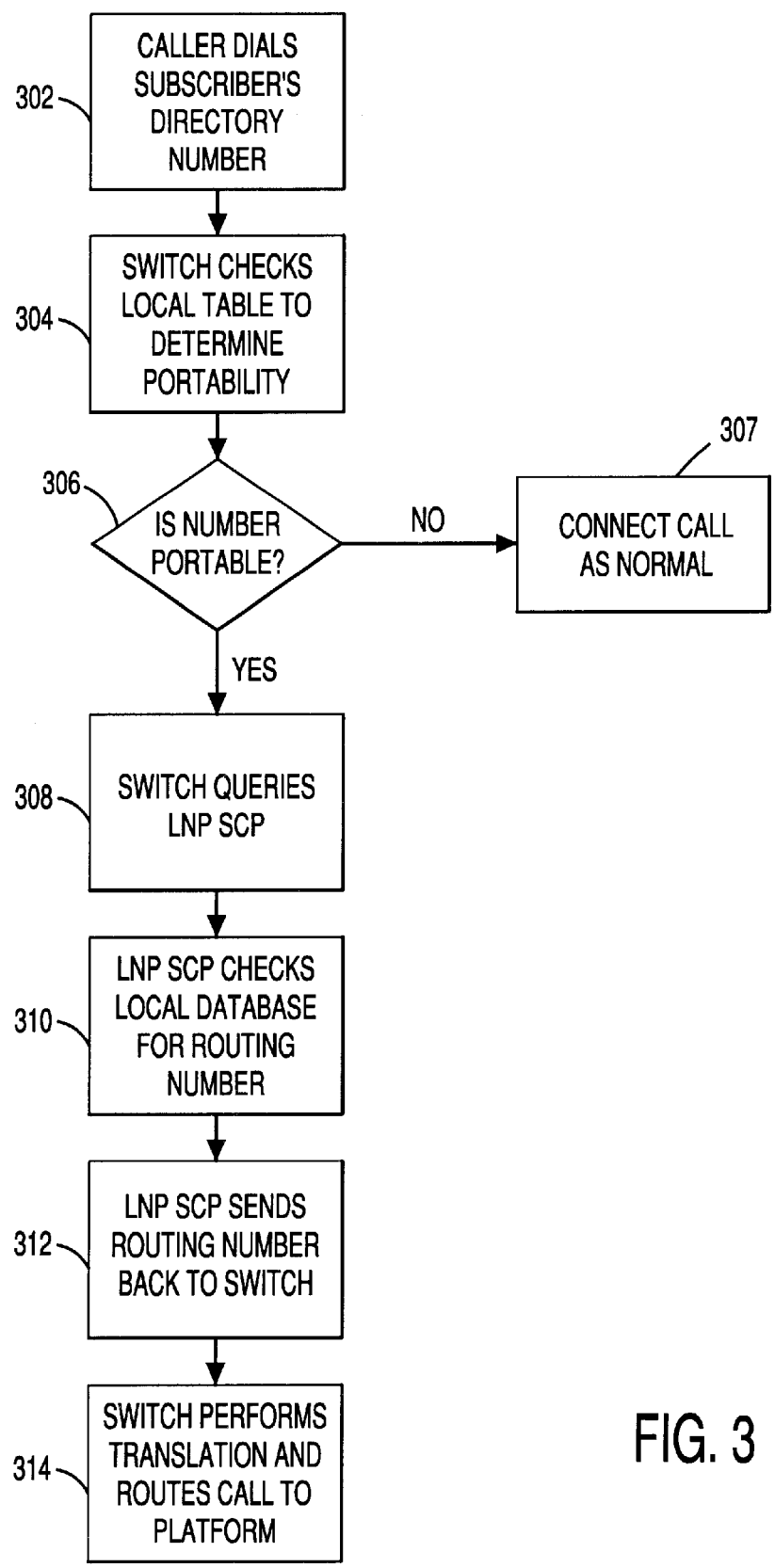
FIG. 3 is a flow chart illustrating steps occurring during a call from a PSTN line to the wireless subscriber's directory number.

FIG. 3 is a flow chart illustrating steps occurring during a call from a PSTN line to the wireless subscriber's directory number. In step 302, the caller dials the subscriber's wireless directory number. In step 304, the switch for the caller checks a local table to determine whether the number is portable. IN step 306, if the number is not portable the call is connected as normal (step 307) the service provider has "ported" the number to itself, the number is listed in the table as portable. In step if the number is portable 308, if the number is portable the switch sends a query to the LNP SCP to determine where the call should be routed. In step 310, the LNP SCP examines its internal databases to determine the new service provider and the routing instructions. The wireless service provider has provided a local routing number for the platform to the PSTN service provider. In step 312, the LNP SCP sends a message back to the switch containing the routing instructions for the service platform.

In step 314, the switch connects the call to the platform. The platform may then perform additional processing and routing. For example, a Follow Me platform would perform the necessary algorithm to determine the most likely location of the caller. Next, the platform would route the call to that directory number.

Having thus described a method and system for routing calls in a wireless network, it should be apparent to those skilled in the art that certain advantages have been achieved. It should also be appreciated that various modifications, adaptations, and alternative embodiments thereof, including its use with Pre-Paid Calling and Caller Pays platforms, for example, may be made within the scope and spirit of the present invention. The invention is further defined by the following claims:

What is claimed is:

1. A method for routing a call directed to a wireless number to a service platform for delivering to the call, the method comprising:

causing the service platform to associate the wireless number with at least one service;

storing the wireless number in a local number portability database;

mapping the wireless number in the local number portability database to a number of the service platform;

querying the local number portability database when a call is made to the wireless number;

in response to the query to the local number portability database, retrieving the number of the service platform;

routing the call to the service platform using the number of the service platform;

causing the service platform to access a database to determine the at least one service associated with the wireless number; and causing the service platform to deliver the at least one service associated with the wireless number to the call.

2. The method for routing a call, as recited in claim 1, further comprising:

when the call is made to the subscriber's wireless number, transmitting the call to a switch; and prior to querying the local number portability database, querying the switch to determine the wireless number is ported.

3. The method for routing a call, as recited in claim 1, wherein the service platform is coupled to an end office.

4. The method for routing a call, as recited in claim 1, wherein the service platform is coupled to a mobile switching office.

5. The method for routing a call, as recited in claim 1, wherein retrieving the number of the service platform comprises:

receiving a local routing number of the service platform; and translating the local routing number into the number for the service platform.

6. The method for routing a call, as recited in claim 1, further comprising:

determining, in the service platform, a service number for locating the subscriber; and routing the call from the service platform to the subscriber using the service number.

7. A method for routing a call directed to a wireless number to a platform for delivering a service to the call, the method comprising:

causing the platform to associate the wireless number with at least one service;

determining the wireless number is ported;

querying a local number portability database for a ported number corresponding to the wireless number;

determining, in the local number portability database, that the ported number corresponding to the wireless number is a routing number for the platform;

translating the routing number to a platform number;

routing the call to the platform using the platform number; and causing the platform to access a database to determine the at least one service associated with the wireless number so that the platform delivers the at least one service associated with the wireless number to the call.

8. The method for routing a call, as recited in claim 7, further comprising the steps of:

determining, in the platform, a service number for locating the subscriber; and routing the call to the subscriber using the service number.

9. The method for routing a call, as recited in claim 7, wherein the platform is coupled to an end office.

10. The method for routing a call, as recited in claim 7, wherein the platform is coupled to a mobile switching office.

11. A system for providing a call directed to a wireless number with service, the system comprising:

a platform for providing the service to the call routed to the platform and for associating in a database the wireless number with at least one service;

a switch storing numbers which are ported, the numbers including a wireless number as ported, wherein the switch is in communication with the platform; and a local number portability database storing the wireless number and a corresponding routing number for the platform as a ported number to which the wireless number is ported, the local number portability database being accessible by the switch, whereby the switch is operative in response to a call to the wireless number to determine the wireless number is ported, the determination causes the switch to query the local number portability database for a corresponding ported number to the wireless number, the local number portability database returns to the switch the routing number for the platform as the ported number, the switch causing the routing number to be translated by the switch into a number for the platform, and the switch using the number for the platform to cause the call to be routed to the platform for the provision of a service of the at least one service associated with the wireless number.

12. The system for providing a wireless telecommunications service, as recited in claim 11, wherein the platform is coupled to an end office.

13. The system for providing a wireless telecommunications service, as recited in claim 11, wherein the platform is coupled to a mobile switching office.

14. The system for providing a service, as recited in claim 11, wherein, in response to routing of the call to the platform, the platform, determines a service number of a subscriber based upon information provided by the subscriber, and wherein the platform routes the call to the service number of the subscriber.

15. The system for providing a service, as recited in claim 11, wherein the service comprises a follow me service, a calling party pays service, or a pre-paid calling service.

16. A method for using elements of an Advanced Intelligent Network (AIN) to route a call directed to a wireless number to a platform to provide a service to the call without having to include the AIN elements in a wireless system providing the service to the wireless number, the method comprising:

characterizing to the AIN the wireless number as ported to a number for the platform;

causing the platform to associate the wireless number with at least one service;

in response to receipt of the call directed to the wireless number, querying a local number portability (LNP) database of the AIN regarding the wireless number;

receiving the number for the platform in response to the query;

routing the call using the number for the platform so as to route the call to the platform; and retrieving from a database the at least one service associated with the wireless number for provision by the platform the at least one service associated with the wireless number to the call.

17. The method of claim 16, wherein, prior to querying the LNP database, in response to the receipt of the call directed to the wireless number, the method comprises determining the wireless number is ported.

18. The method of claim 17, wherein receiving the number for the platform comprises receiving the number for the platform in response to the query based on the wireless number being ported to the number for the platform.

19. The method of claim 16, wherein the number for the platform comprises a local routing number (LRN); and wherein routing the call using the number for the platform comprises routing the call using the LRN.

20. The method of claim 19, wherein routing the call using the LRN comprises translating the LRN into a number for the platform and routing the call using the number for the platform.

21. The method of claim 16, further comprising:

after routing the call to the platform, providing the service to the call.

22. The method of claim 21, wherein providing the service comprises providing a follow me service, a pre-paid calling service, or a calling party pays service.

23. A method to make use of elements of an Advanced Intelligent Network (AIN) to route a call directed to a wireless number to a platform to provide a service to the call without having to include the AIN elements in a wireless system providing the service to the wireless number, comprising:

causing the platform to associate the wireless number with at least one service;

causing the wireless number to be characterized as ported to the elements of the AIN;

providing a ported number for the wireless number, the ported number corresponding to a number for the platform operative to provide the service to the call, so that the call is routed to the number for the platform; and retrieving from a database the at least one service associated with the wireless number for provision of the at least one service associated with the wireless number rather than routing of the call to the wireless number.

24. The method of claim 23, wherein providing the ported number comprises providing a number of the platform as the ported number for the wireless number.

25. The method of claim 23, further comprising:
   after the call is routed to the platform, providing the service to the call.

26. The method of claim 25, wherein providing the service comprises providing a follow me service, a pre-paid calling service, or a calling party pays service.

27. A system for using elements of an Advanced Intelligent Network (AIN) to route a call directed to a wireless number to a platform to provide a service to the call without having to include the AIN elements in a system providing the service to the wireless number, the system comprising:
   a switch being operative, in response to receipt of the call directed to the wireless number, to query a local number portability (LNP) database in the AIN regarding the wireless number;
   the platform being operative to associate the wireless number with at least one service in a database;
   the LNP database including the wireless number as ported to a number of the platform, and the LNP database being operative to respond to the query with the number of the platform as the ported number for the wireless number; and
   the switch being operative, in response to receipt of the number of the platform as the ported number for the wireless number, to route the call to the number of the platform for provision of a service of the at least one service associated with the wireless number.

28. The system of claim 27, wherein the switch comprises including a characterization of the wireless number as ported; and wherein the switch is operative, as a condition to querying the LNP database, to determine the wireless number is ported.

29. The system of claim 27, wherein the number for the platform comprises a local routing number (LRN).

30. The system of claim 29, wherein the switch is operative to translate the LRN into a number for the platform and to route the call using the number.

* * * * *

UNITED STATES PATENT AND TRADEMARK OFFICE
CERTIFICATE OF CORRECTION

PATENT NO.     : 6,356,756 B1
DATED          : March 12, 2002
INVENTOR(S)    : Karl H. Koster It is certified that error appears in the above-identified patent and that said Letters Patent is hereby corrected as shown below:

<u>Title page,</u>
 Item "[73], Assignee: BellSouth Corporation, Atlanta, GA (US)" and insert in its place, -- [73], Assignee: BellSouth Intellectual Property Corporation, Wilmington, DE (US) --

Signed and Sealed this

Twenty-ninth Day of April, 2003

JAMES E. ROGAN
*Director of the United States Patent and Trademark Office*